United States Patent
Pierson et al.

(10) Patent No.: US 9,130,652 B2
(45) Date of Patent: Sep. 8, 2015

(54) SECURITY LOCK FOR SMARTPHONES

(71) Applicants: Cyndy Pierson, Salinas, CA (US); Mark A Boys, Aromas, CA (US)

(72) Inventors: Cyndy Pierson, Salinas, CA (US); Mark A Boys, Aromas, CA (US)

(*) Notice: Subject to any disclaimer, the term of this patent is extended or adjusted under 35 U.S.C. 154(b) by 11 days.

(21) Appl. No.: 13/909,473

(22) Filed: Jun. 4, 2013

(65) Prior Publication Data
US 2014/0357331 A1    Dec. 4, 2014

(51) Int. Cl.
| H04M 1/00 | (2006.01) |
| H04B 1/3888 | (2015.01) |
| H04M 1/18 | (2006.01) |
| A45F 5/02 | (2006.01) |
| A45C 11/00 | (2006.01) |
| A45C 13/18 | (2006.01) |

(52) U.S. Cl.
CPC .............. *H04B 1/3888* (2013.01); *A45C 11/00* (2013.01); *A45C 13/18* (2013.01); *A45F 5/021* (2013.01); *H04M 1/185* (2013.01); *A45C 2011/002* (2013.01)

(58) Field of Classification Search
CPC .. H04B 1/3888; H04B 1/3816; H04B 1/3877; H04B 1/3827; H04B 1/3833; H04B 1/3838; H04M 1/04; H04M 1/0202; H04M 1/0283; H04M 1/026; H04M 1/0249; H04M 1/0254; H04M 1/0262
USPC .......................................... 455/575.1, 575.8
See application file for complete search history.

(56) References Cited

U.S. PATENT DOCUMENTS

| 6,626,336 B1* | 9/2003 | Krusell .......................... 224/271 |
| 2001/0007823 A1* | 7/2001 | Lee ................. 455/573 |
| 2009/0119938 A1* | 5/2009 | Song .......................... 33/366.14 |
| 2010/0078343 A1* | 4/2010 | Hoellwarth et al. .......... 206/320 |
| 2010/0147041 A1* | 6/2010 | Teicher et al. ..................... 70/58 |
| 2011/0077061 A1* | 3/2011 | Danze et al. ................ 455/575.1 |
| 2012/0080469 A1* | 4/2012 | Souders ........................ 224/600 |
| 2013/0030480 A1* | 1/2013 | Donate et al. ................. 606/328 |

FOREIGN PATENT DOCUMENTS

WO   WO 03/067856   * 8/2003

* cited by examiner

*Primary Examiner* — Wayne Cai
*Assistant Examiner* — Said Elnoubi
(74) *Attorney, Agent, or Firm* — Donald R. Boys; Central Coast Patent Agency, Inc.

(57) ABSTRACT

A protective case for a smartphone has a planar portion of the length and width of the smartphone, an upper portion shaped to capture a smartphone leaving a touchcreen of unobstructed, the upper portion enabled to fasten to the planar portion, an opening into the planar portion, the opening having an axis at right angles to the plane of the planar portion on a side opposite the upper portion, pairing circuitry enclosed in the protective case for wirelessly pairing with the smartphone, a power source enclosed in the planar portion for powering circuitry and mechanisms in the protective case, a locking mechanism in the planar portion proximate the opening, enabled to engage to an anchor pin inserted into the opening, and circuitry enabled to accept an unlock command via wireless communication from a smartphone executing a security application, the command causing the locking mechanism to release from an anchor pin.

11 Claims, 12 Drawing Sheets

*Fig. 2*

Prior Art

*Fig. 3*

Prior Art

SECURITY LOCK FOR SMARTPHONES

BACKGROUND OF THE INVENTION

1. Field of the Invention

The present invention is in the technical area of smartphones, and pertains more particularly to devices and methods for securely docking a smartphone to another physical body.

2. Description of Related Art

Smartphones and carrier wallets and cradles are very well known in the art, and afford some security to carrying a smartphone and having ready access for use. The security level of conventional carrying apparatus, however, leaves a lot to be desired, and thieves everywhere continue to target smartphones for theft. One of the problems is that a conventional carrying device for carrying a smartphone attached to a belt, for example, is not difficult to remove from the belt. What is clearly needed is a very secure way to lock smartphones and carriers to personal items or other anchors, which will be very difficult to release.

BRIEF SUMMARY OF THE INVENTION

In one embodiment of the present invention a protective case for a smartphone is provided, comprising a planar portion of about the length and width of the smartphone, an upper portion shaped to capture the smartphone around a periphery, leaving a touchcreen of the smartphone unobstructed, the upper portion enabled to fasten securely to the planar portion, securely capturing the smartphone, an opening into the planar portion, the opening having an axis at right angles to the plane of the planar portion on a side opposite the upper portion, wireless pairing circuitry enclosed in the protective case for wirelessly pairing with the smartphone, a power source enclosed in the planar portion for powering circuitry and mechanisms in the protective case, a locking mechanism implemented in the planar portion proximate the opening, enabled to engage to an anchor pin inserted into the opening, and circuitry enabled to accept an unlock command via wireless communication from a smartphone executing a security application, the command causing the locking mechanism to release from an anchor pin.

In one embodiment the locking mechanism comprises at least one locking pin urged toward the opening by a spring element in a direction parallel to the plane of the planar portion, such that an anchor pin entering the opening causes the locking pin to retract against the spring element until a groove in the anchor pin is encountered, at which point the spring element urges the locking pin into the groove, locking the anchor pin to the planar portion of the protective case. Also in one embodiment the protective case comprises two locking pins urged from opposite sides toward the opening by two respective spring elements.

In one embodiment the at least one locking pin translates in a bore having an axis parallel to the plane of the planar portion, the locking pin has a ferromagnetic element, and an electromagnet proximate the bore, when activated, causes the locking pin to retract, releasing the anchor pin. Also in one embodiment the protective case further comprises a switching element at a closed end of the opening, such that an anchor pin fully inserted into the opening operates the switching element, sending a command to a paired smartphone to execute the security application.

In another aspect of the invention a protective case and smartphone assembly is provided, comprising a planar portion of the protective case of about the length and width of the smartphone, an upper portion capturing the smartphone around a periphery, leaving a touchcreen of the smartphone unobstructed, the upper portion fastening securely to the planar portion, securely capturing the smartphone, an opening into the planar portion, the opening having an axis at right angles to the plane of the planar portion on a side opposite the upper portion, pairing circuitry enclosed in the protective case for wirelessly pairing with the smartphone, a power source enclosed in the planar portion for powering circuitry and mechanisms in the protective case, a locking mechanism implemented in the planar portion proximate the opening, enabled to engage to an anchor pin inserted into the opening, and circuitry enabled to accept an unlock command via wireless communication from the smartphone executing a security application, the command causing the locking mechanism to release from an anchor pin.

In one embodiment of the assembly the locking mechanism comprises at least one locking pin urged toward the opening by a spring element in a direction parallel to the plane of the planar portion, such that an anchor pin entering the opening causes the locking pin to retract against the spring element until a groove in the anchor pin is encountered, at which point the spring element urges the locking pin into the groove, locking the anchor pin to the planar portion of the protective case. Also in one embodiment there are two locking pins urged from opposite sides toward the opening by two respective spring elements.

In one embodiment the at least one locking pin translates in a bore having an axis parallel to the plane of the planar portion, the locking pin has a ferromagnetic element, and an electromagnet proximate the bore, when activated, causes the locking pin to retract, releasing the anchor pin. Also in one embodiment the protective case further comprises a switching element at a closed end of the opening, such that an anchor pin fully inserted into the opening operates the switching element, sending a command to a paired smartphone to execute the security application.

In yet another aspect of the invention an anchor object is provided, comprising a substantially planar portion, and a cylindrical anchor pin securely attached to the planar portion, the anchor pin having a major diameter, an axis at a right angle to the plane of the planar portion, a rounded end away from the planar portion, and a groove having a minor diameter less than the major diameter, the groove implemented to provide a locking element. In one embodiment the planar portion has substantially the length and width of a smartphone, comprises clips around a periphery enabled to capture and hold a smartphone, and guide loops on a side opposite the clips to engage a user's belt. In another embodiment the planar portion has substantially the length and width of a smartphone, comprises clips around a periphery enabled to capture and hold a smartphone, an extended element in the plane of the planar portion enabling connection to a lanyard, and an opening through the planar portion providing unobstructed visual access for a camera lens and flash of a smartphone. In yet another embodiment the planar portion forms a pocket to hold a smartphone, and there are secondary pockets for cash and credit cards. In still another embodiment the substantially planar portion is a disk with the anchor pin mounted about in the center of the disk.

DETAILED DESCRIPTION OF THE INVENTION

Figure 1A:
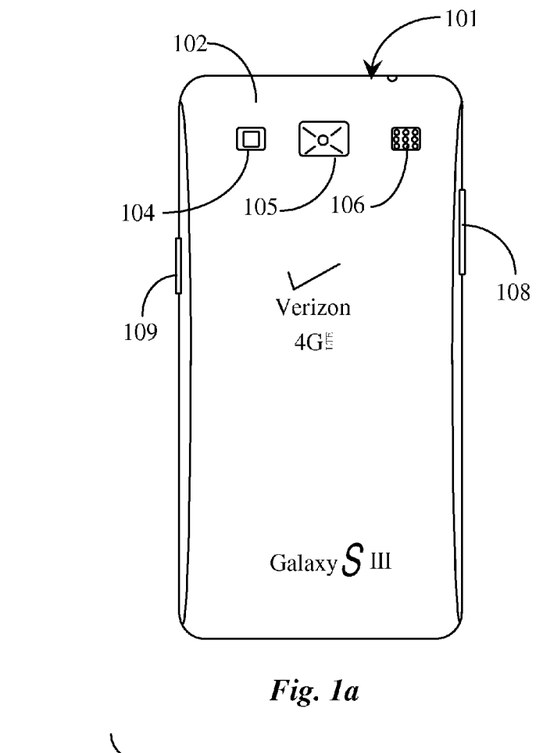
FIGS. 1a, b and c is an elevation view of the back, edge and front of a familiar smartphone.
Figures 1B, 1C:
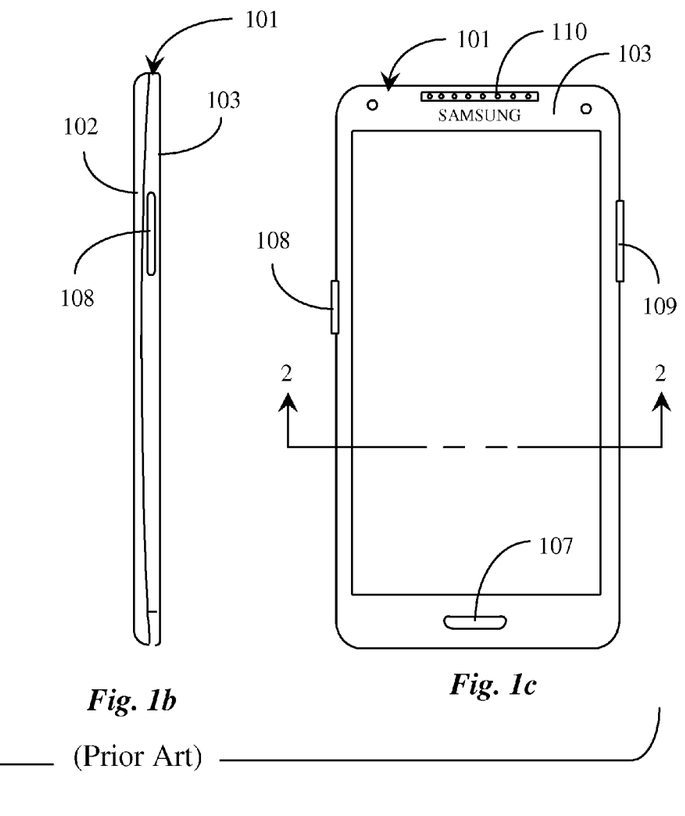

FIGS. 1a, b and c illustrate an elevation view of the back, edge and front of a familiar smartphone 101. This example illustrates a Samsung Galaxy S III™ cellular telephone, but this is meant to represent all of the many sorts and models of cellular telephones that are currently available. FIG. 1a is an elevation view of the back 102 of this representative smartphone 101, showing a flash illuminator 104 for photography, a camera lens 105, a speaker 106, a power/reset/lock key 109, a volume key 108, and various indicia identifying the make a model of the smartphone. FIG. 1b is a side view of smartphone 101 illustrating the volume key 108 and the front edge 103 and back edge 102. FIG. 1c is an elevation view of the front 103 of smartphone 101, showing the keys 108 and 109 previously described a microphone bar 110 and a "home" key 107.

Smartphone 101 as described above is exemplary of many such phones which have similar I/O interfaces and functions. In providing a carrier or case for such a smartphone it is important that the microphone be unobstructed, the camera lens and the flash are unobstructed, and that the face of the phone, which is in most cases a touch screen for input and graphical output, be presented to the user in a manner that the features may be used.

Figure 2:
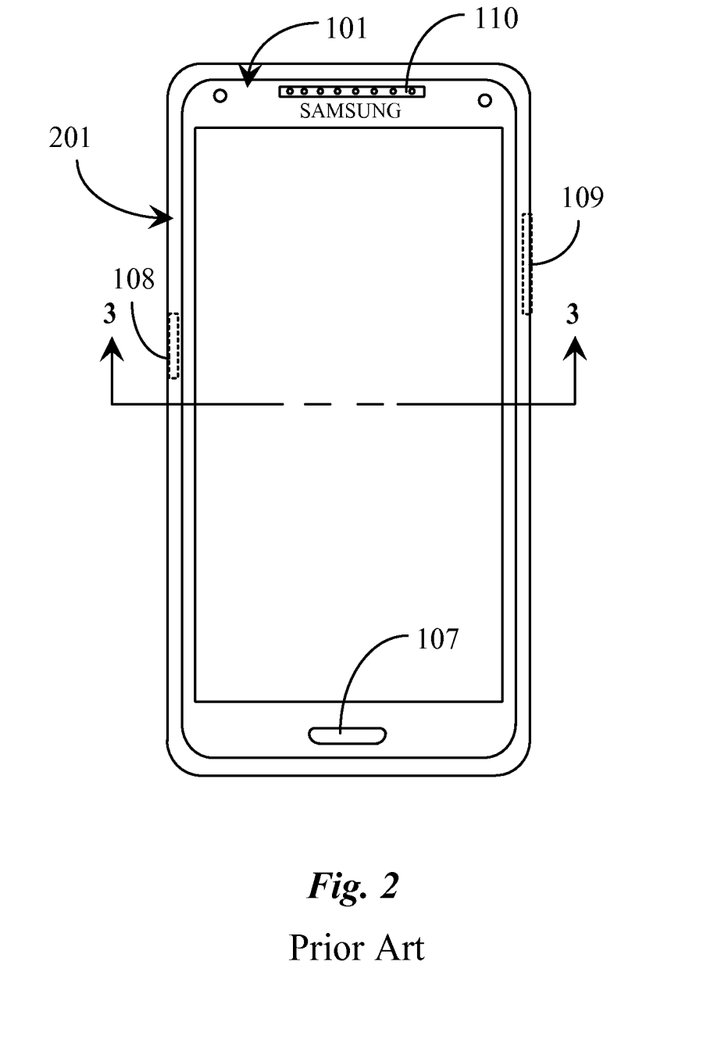
FIG. 2 is a front view of the smartphone of FIG. 1 including a protective case.

FIG. 2 is a front view of the smartphone of FIG. 1 including a hard-plastic protective case 201. The protective case is not a requirement to carry and use the smartphone, but users typically opt for such a case to protect the usually-expensive devices. Referring back to FIGS. 1a, b and c, attention is drawn to the touch-screen face of the smartphone, to the buttons on the front and edges, and to the flash, camera lens and speaker on the back.

Protective case 20, typically fashioned of hard plastic material, is substantially open in the front, so the touch screen and the front buttons are accessible to use the smartphone. The protective case curves over the outer periphery of the front of the smartphone, as shown in FIG. 2. Buttons 108 and 109 are seen in this view as dotted (hidden).

Figure 3:
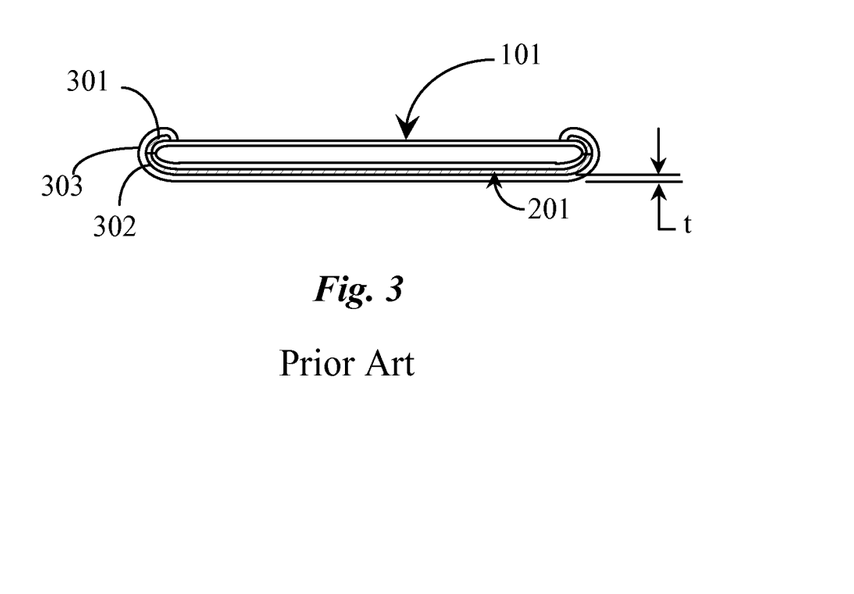
FIG. 3 is a cross-section view of the smartphone and case of FIG. 2, including a flexible bumper covering.

FIG. 3 is a cross-section of smartphone 101 and protective case 201 taken along section line 3-3 of FIG. 2, at about the center of the telephone vertically, and includes a rubber (or rubberlike) bumper sleeve 303 which in many instances is used to stretch over the hard-plastic protective case, to add shock protection in the case the smartphone might be dropped or banged against some object.

Hard plastic protective case 201 in this example is made in two pieces, being a front piece 301 that registers over the front of the smartphone around the outer edges, and a back piece 302 that substantially covers the back of the smartphone, except for openings that are provided for the flash device, the camera lens and the speaker (openings not shown). Thickness "t" of the back piece over the back of the smartphone is typically of the order of one-eighth of an inch, but may be different in different models of protective covers for different makes and models of telephones.

Front piece 301 and back piece 302 register and snap together by snap devices (not shown) around the edges. These snap devices, and protective covers of this sort are well-known in the art, and are therefore not shown or described in additional detail. The rubberlike bumper cover 303, if used, is all one piece, and also has openings for the flash, lens and speaker if the back is covered, but in some instances is open on the back as well as the front, so it acts as a bumper around all four edges.

Figure 4:
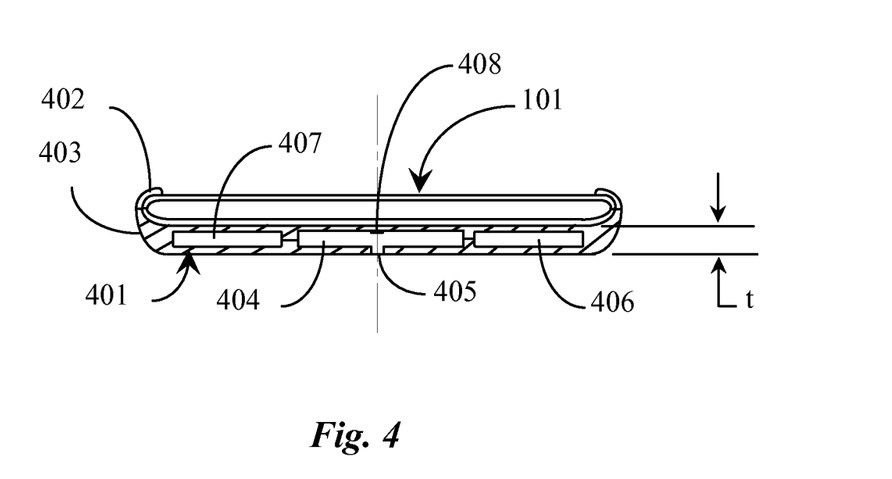
FIG. 4 is a cross section view of a smartphone and protective case in an embodiment of the present invention.

FIG. 4 is a cross section of a plastic protective case in an embodiment of the present invention, including unique enhancements to provide secure locking of the case to various other objects and apparatus, such as a desktop, a belt interface, or a lanyard interface, to name just a few of possible anchor points. In this embodiment the back piece 403, comprising a substantially planar portion of protective cover 401, has a thickness "t" greater than that thickness for the conventional protective cover 201. This thickness in one embodiment is about one-quarter of an inch, and provides volume in the planar back piece of the protective cover for a locking apparatus 404 and Bluetooth or other wireless pairing circuitry 406 implemented within the back piece 403 of protective cover 401. In some alternative embodiments the thickness is less than one-quarter of an inch. No detail of the locking apparatus or the pairing circuitry is shown in this illustration due to limitation of scale. This detail is shown in other drawings described in enabling detail below. An opening 405 is provided from the outside of protective cover 401 through back piece 403 into the region of the locking apparatus 404. This opening is to receive a shaft or other protrusion of an anchor object or apparatus, details of which are shown and described below in various embodiments. This opening may be round or of other geometric cross section to accommodate shafts or protrusions of other shapes than round. Further a battery 407 provides power for operation of both the locking apparatus and the Bluetooth pairing circuitry. It is known to the inventor that power may also be supplied via solar cell resident on protective cover 401 so that a battery is not needed. Opening 405 in various embodiments does not pass all the way through back piece 403, and there may be a switching element 408 at the closed end of the opening to sense that an extension entering the opening is, in fact, present and fully extended into the opening to the closed end of the opening.

Figure 5:
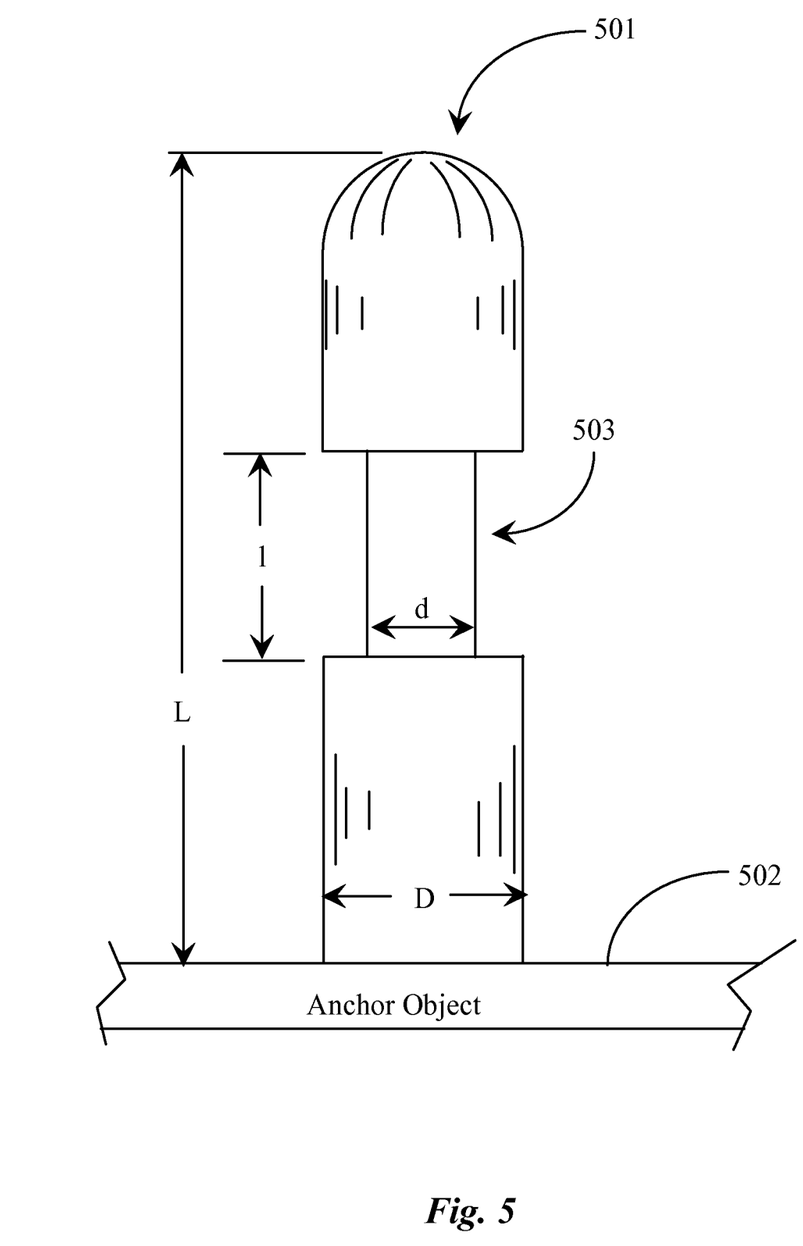
FIG. 5 is an elevation view of an anchor pin 51 securely attached to an anchor object in an embodiment of the invention.

FIG. 5 is an elevation view of an anchor pin 501 securely attached to an anchor object 502. Attachment to the anchor object may be by any one of a variety of ways, depending at least partly on the nature of the anchor object. The pin may be screwed to the object, welded, soldered, glued or attached in another way.

Pin 501 in this embodiment is shown considerably magnified to describe detail. Pin 501 in this embodiment has a length "L" of about one-quarter of an inch, and a major diameter "D" of about one-sixteenth inch, a ratio of length to diameter of 4:1. Pin 501 in this embodiment has a circumferential groove 503 of a height "1" of about one-sixteenth inch in this embodiment, and a depth of about 0.016 inch, making minor diameter "d" about one-thirty-second of an inch, or about 0.031 inch. The pin is rounded on the end away from the anchored end, and the reason for this is described below.

Referring back to FIG. 4, pin 501 which may be anchored to a desk, a wall, a belt, and article of clothing, or to any of a variety of other objects, is meant to engage with case 401 through opening 405, which provides access to a locking apparatus 404, described in enabling detail below.

Figure 6:
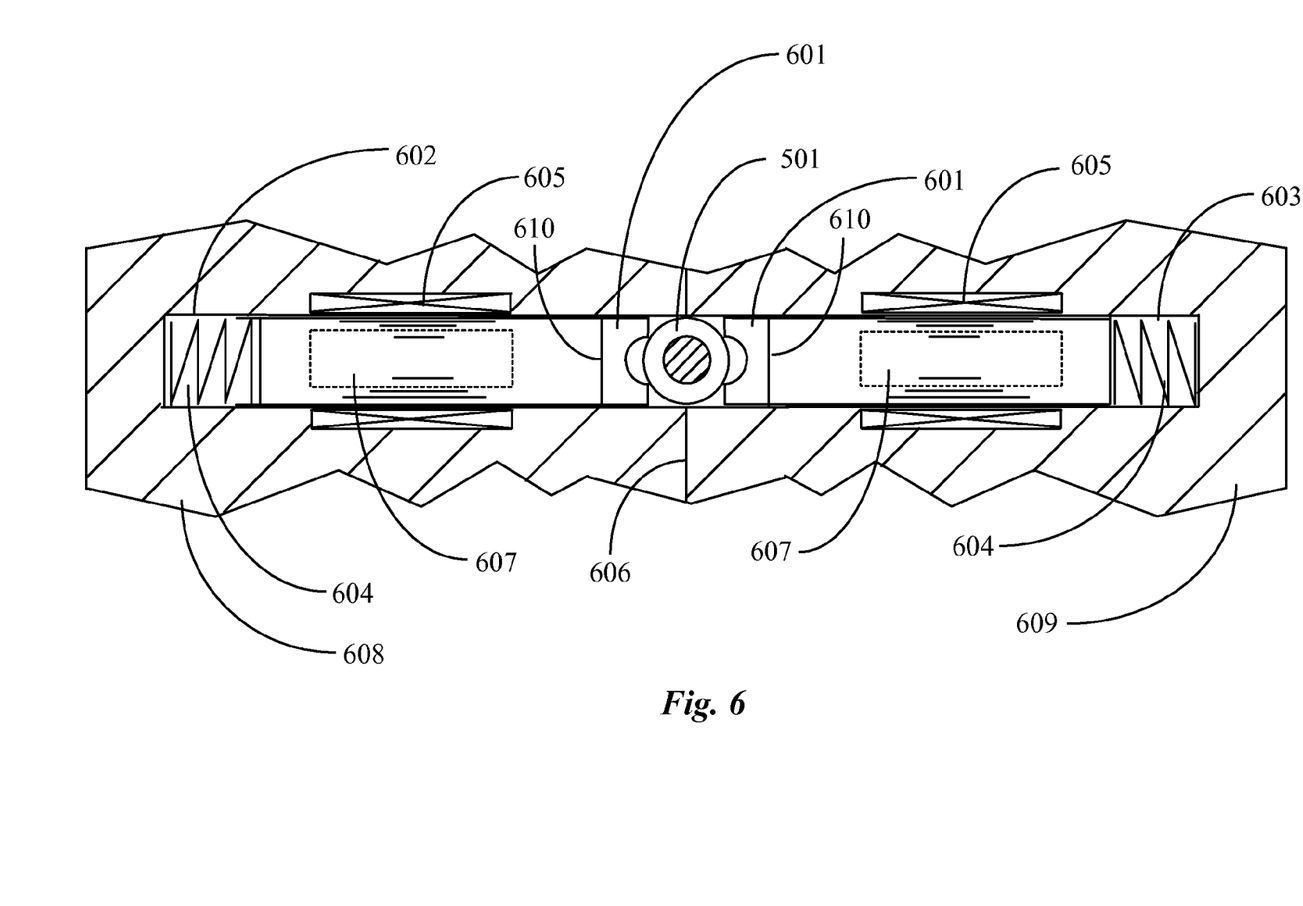
FIG. 6 is a plan view from above of a locking apparatus in an embodiment of the invention.

FIG. 6 is a plan view from above of locking apparatus 404 within the back piece of case 401, with a pin 501 inserted in opening 405, the pin shown cut off horizontally through the minor diameter "d" of the circumferential groove 503. Locking apparatus 404 comprises in this embodiment two separate base bodies 608 and 609, within which bores 602 and 603 are implemented. The diameter of each bore is about 0.063, and the depth of each bore is about 0.312 inch from common face 606. After boring, the initial portion of a length of about 0.063 of each bore is machined to be square, rather than round. This portion served to house a square portion of each of locking pins 601, and to guide the locking pins in operation without rotating.

Figure 7:
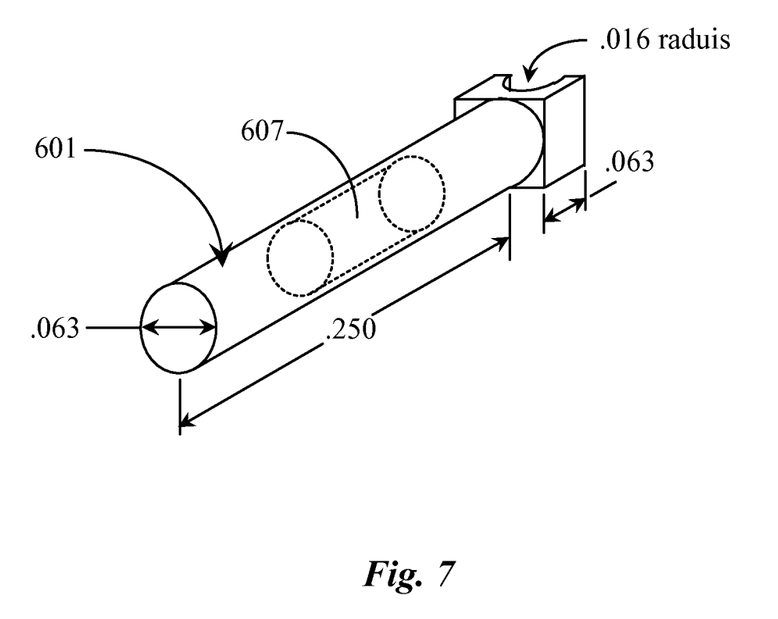
FIG. 7 is a perspective view of the locking pin of FIG. 6.

Two locking pins 601 are used; one inserted into each of bores 602 and 603. The diameter of locking pins 601 is provided to be a slip fit in the bores 602 and 603. FIG. 7 is a perspective view of locking pin 601, showing a 0.063 diameter round portion of length 0.250, and a square portion 0.063 on a side on one end. The square portion has a semicircular cutout of a 0.016 radius as shown. This square portion is made to fit into groove 503 of pin 501 from each side, and locks pin 501 securely when the locking pins 601 are extended from the bores 602 and 603.

Each locking pin 601 is biased toward pin 501 by a spring 604, such that without pin 501 in opening 405 the locking pins are fully extended and will contact one another. Each locking pin 601 further comprises a ferromagnetic internal component 607, and an electromagnet coil 605 is built into each of base bodies 608 and 609, surrounding bores 602 and 603, such that engaging the electromagnets will cause locking pins 601 to retract from the area of pin 501 against springs 604 to points 610, the position shown in FIG. 6.

Figure 8:
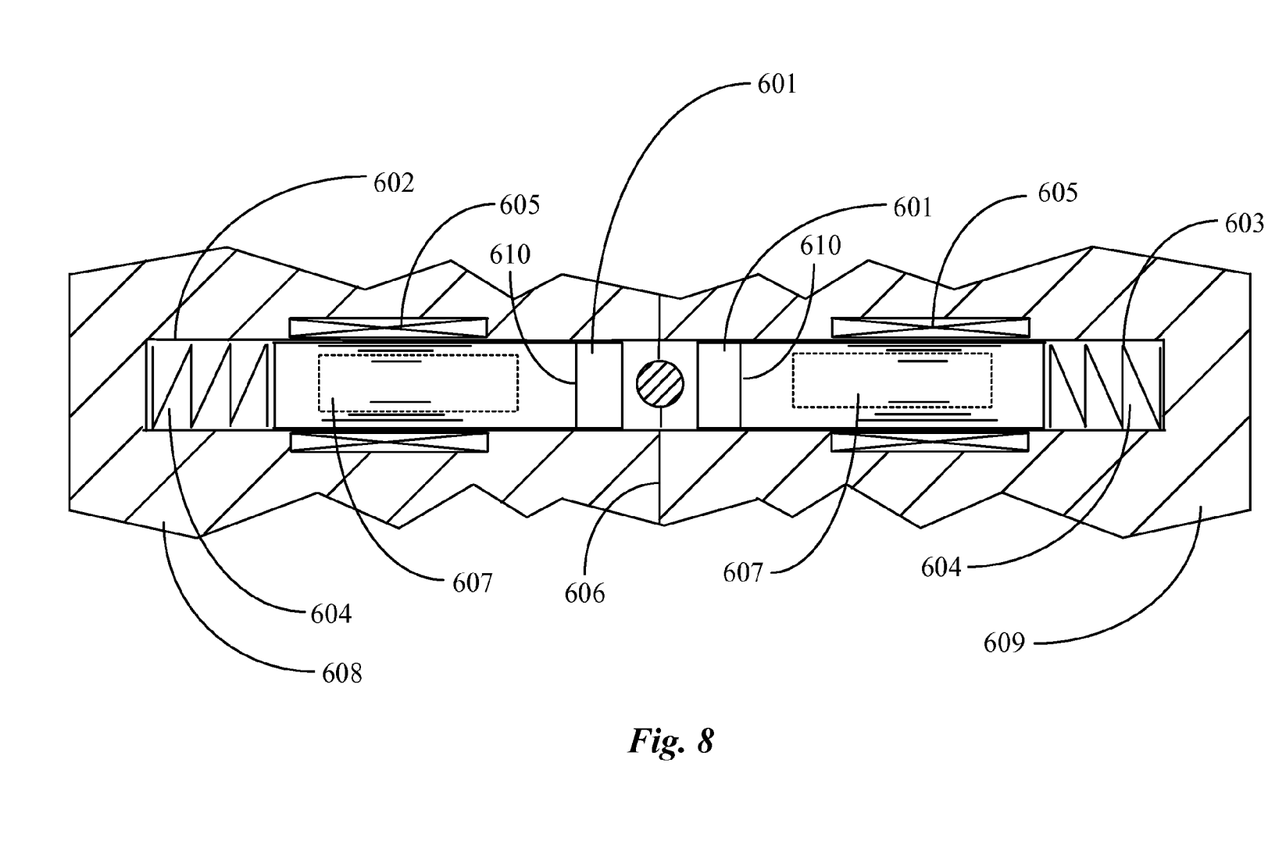
FIG. 8 is a view from above of the locking apparatus of FIG. 6 showing the apparatus unlocked.

FIG. 8 shows electromagnets 605 disengaged and locking pins 601 thus urged forward by springs 604 to meet at interface 606, each locking pin at that point fully engaging pin 501 in groove 503, if in fact pin 501 is fully inserted into opening 405. In this embodiment extension of the locking pins is by springs 604, and retraction of the locking pins is by engagement of the electromagnets surrounding bores. In some alternative embodiments extension and retraction may be accomplished both by electromagnet operation.

It should be apparent that, without a pin 501, typically joined to some anchor object, inserted in opening 405, locking pins 601 will be urged forward to contact with the semicircular radii ends forming a circle of about diameter "d" us shown in FIG. 8. If, in that circumstance protective case 401 were to be positioned to engage a pin 501, the rounded end of pin 501 entering opening 405 will urge locking pins 601 to retract against springs 604 until pin 501 is far enough into opening 405 that groove 503 lines up with the square ends of locking pins 601, at which point the locking pins will snap forward, engaging groove 503 and securely locking protective cover 401 to whatever anchor object is holding pin 501. This, in one embodiment, is the process of locking smartphone 101 held in protective cover 401 to an anchor object such as a user's desk, belt, or an article of clothing or lanyard carrier. The action in this embodiment locking the smartphone to an anchor object is fully manual, and requires no electromechanical manipulation.

Figure 9A:
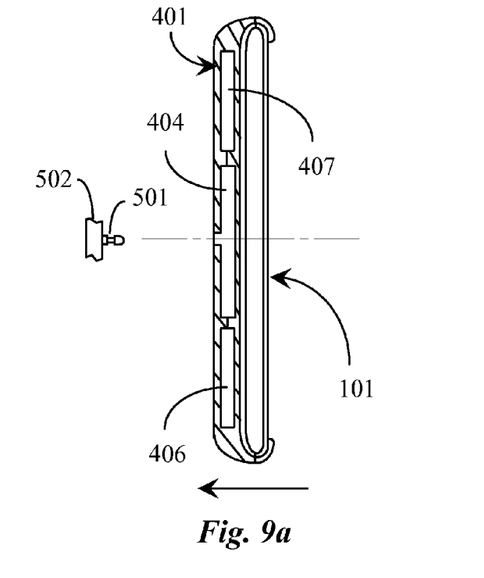
FIG. 9a-9d illustrates a process of joining and locking a protective cover and smartphone assembly in an embodiment of the invention to an anchor pin.

Unlocking smartphone 101, once locked to an anchor object requires retraction of locking pins 601, which in this embodiment is accomplished by engaging electromagnets 605. FIGS. 9a, b, c and d illustrate a process of locking smartphone 101, held in case 401 to an anchor object, and subsequently unlocking from the anchor object and taking smartphone 101 away from its anchor.

Figure 9B:
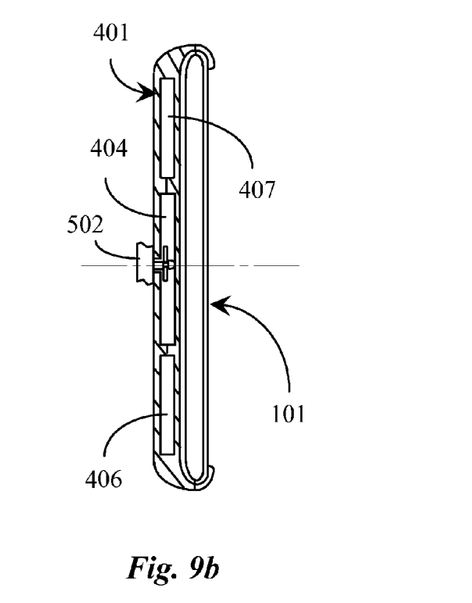
Figure 9C:
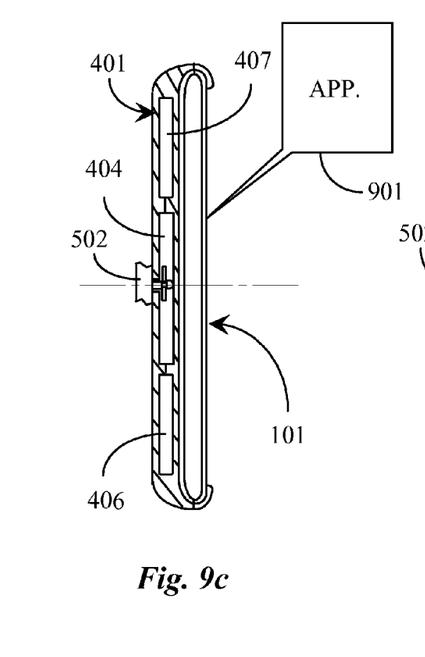
Figure 9D:
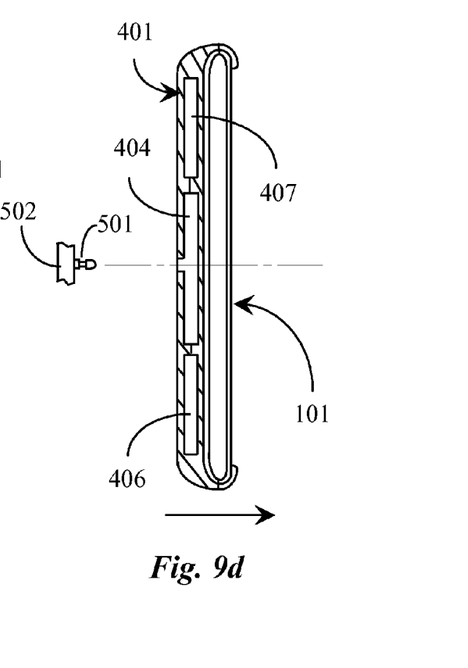

In FIG. 9a smartphone 101 is held near a pin 501 mounted to an anchor object 502. Moving the smartphone and carrying case to the anchor pin 501 in the direction of the arrow, such that opening 405 is engaged over the anchor pin will cause the locking apparatus 404 to engage pin 501 and lock securely, as shown in FIG. 9b. FIG. 9c shows the smartphone locked to the anchor object and a software application 901 initiated on the smartphone. App. 901 is provided to enable unlocking from pin 501. App. 901 is a very simple app. that is initiated by a user touching the touchscreen, stroking the touchscreen or providing some other pre-programmed initialization, such as a series of three taps on the touchscreen, fingerprint recognition or voice recognition. The enabling action may be with the touchscreen or with one of the buttons on the smartphone. Once the app is initialized, there are a variety of ways the locking apparatus may be caused to unlock the smartphone. For example, voice command mode may be initiated, and the user may verbalize a pre-configured voice command to unlock the smartphone. The user may say "unlock", "release", "gimme", "pinnochio", or any other voice command configured for the purpose, and may use settings for the smartphone to select or enter a different voice command for the purpose.

Once the command is made, app. 901, having paired with Bluetooth pairing circuitry 406, communicates the unlock command to the locking apparatus, which engages electromagnets 605 powered by solar (not shown) or battery 407, which retracts the locking pins and allows the protective case and smartphone to be removed. In one embodiment the retraction of the locking pins is timed to be on the order of at most a few seconds, after which the electromagnets are released, the locking pins are again urged forward by springs 604, and the locking apparatus is thus reset to lock again to a pin 501 anywhere the user may choose to dock the smartphone.

In some embodiments the anchor pin 501 and the locking pins 601 may be configured differently to lock and unlock. In some embodiments the lock to the anchor pin may be accomplished by a different locking mechanism. There needs to be an anchor mechanism that engages with the protective case, another mechanism for engaging and disengaging a lock, and a command sequence. In some embodiments the command may be a manual initiation with an I/O mechanism on the case itself, without an application on the smartphone.

In the embodiments thus far described there is an opening in the back of the case, near the center, for entry of the anchor pin. Such entry is typically accomplished in these embodiments by moving the smartphone in its protective case to the anchor, the locking mechanism being in the protective case, not in the telephone.

In some embodiments the opening for receiving the anchor pin may not be in the center of the back of the protective case. It may be at another point on the back of the protective case. Also in some embodiments there may be two or more openings for anchor pins, which also provides for a stable attachment to an anchor such that the smartphone might not rotate about the anchor pin while locked to it. In some embodiments one or more openings with locking mechanism may be implemented in one or more edges of the protective case.

In an alternative embodiment of the invention an opening and a locking mechanism for locking to an anchor pin may be implemented in a smartphone as original equipment, and may be located in any convenient place on the smartphone.

Figures 10A, 10B:
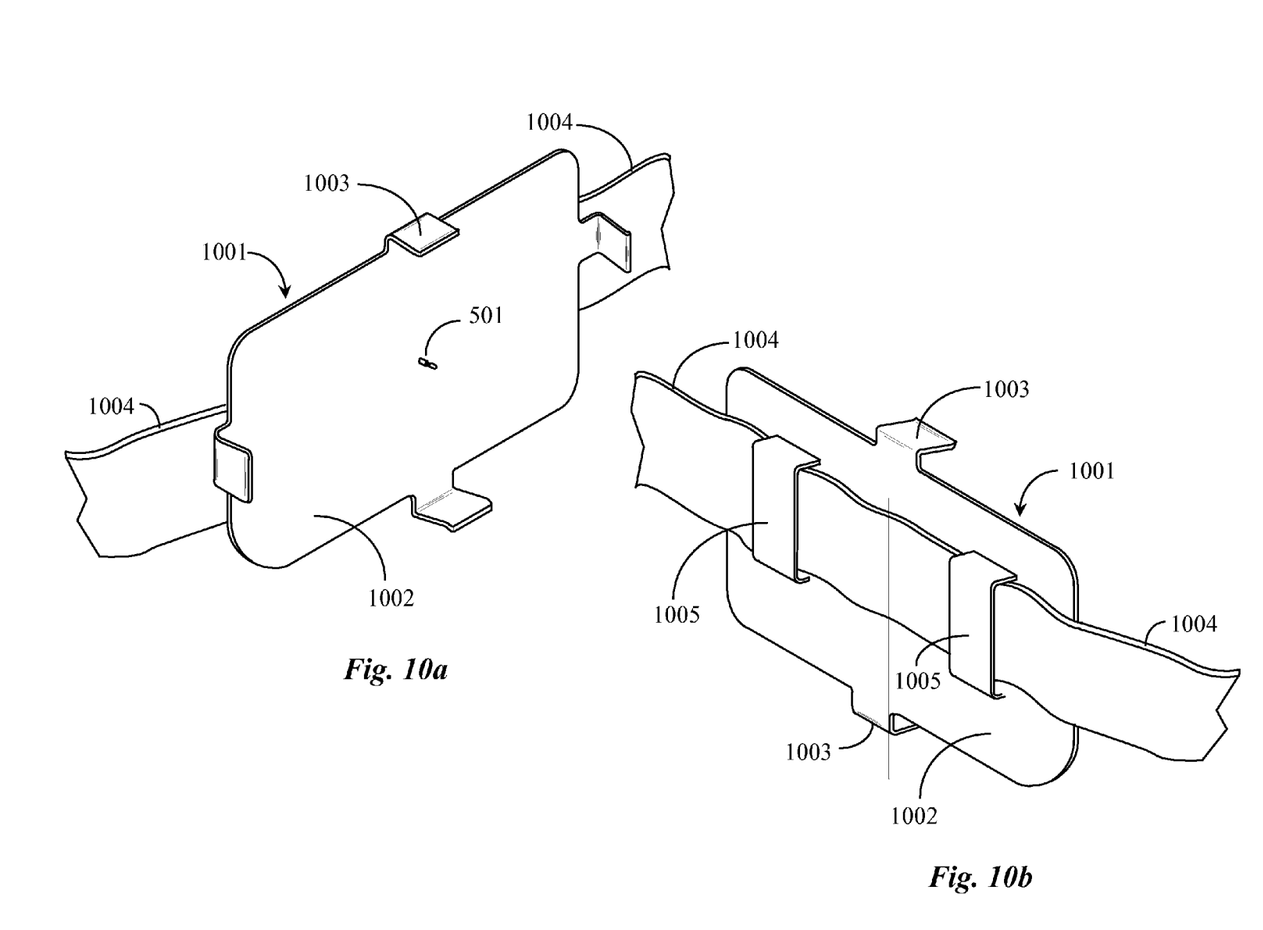
FIG. 10a illustrates a front view of an anchor object for locking a protective cover and smartphone assembly to a user's belt.
FIG. 10b shows a backside of the object of FIG. 10a, illustrating guide loops for a user's belt.

FIGS. 10a and b illustrate perspective views of an anchor apparatus 1001 to anchor a smartphone protective case to a user's belt. Apparatus 1001 comprises a substantially flat anchor plate 1001 with, in this embodiment, four molded clips 1003, such that a smartphone as shown in FIGS. 9a-9c in a protective case such as case 401 may be anchored to a user's belt 1004. Anchor apparatus 1001 has an anchor pin 501 securely attached in substantially the center of the apparatus, extending on the side that a protective case would be snapped into the apparatus by clips 1003. FIG. 10b illustrates the apparatus of FIG. 10a reversed to show the backside, including two guide loops 1005 in this embodiment, with the user's belt 1004 passed through both loops 1005.

A user may position the smartphone in protective case 401. Case 401 having the opening and locking mechanism described above with reference to FIGS. 6-8, over apparatus 1001, aligned with clips 1003, and press the protective case into apparatus 1001. The smartphone in the protective case will be clipped onto the apparatus 1001 by clips 1003, and anchor pin 501 will enter opening 405, causing locking pins 601 to retract until groove 503 is reached, at which time the locking pins will snap forward, and the protective case with the smartphone securely held in apparatus 1001 on the user's belt in a manner that it cannot be removed without the unlock command of the user, as described above.

Figure 11:
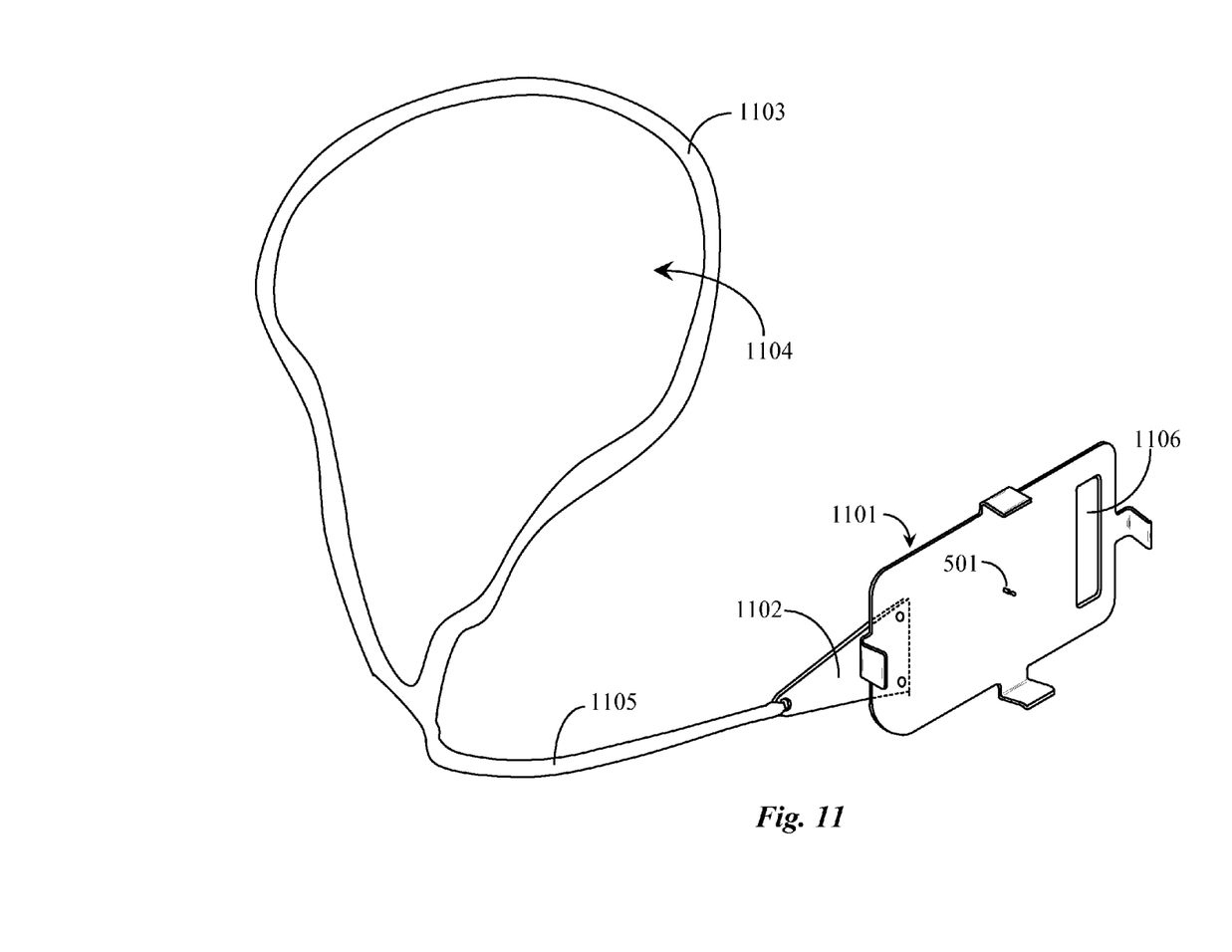
FIG. 11 illustrates an anchor object for use with a lanyard in an embodiment of the invention.

FIG. 11 is a perspective view of an anchor apparatus 1101 for anchoring a smartphone securely held in a protective case according to an embodiment of the present invention to a lanyard 1103 that the user may wear around the user's neck or body. Anchor apparatus 1101 in this embodiment is quite similar to apparatus 1001 of FIG. 10a, with two notable exceptions. Apparatus 1101 has a securely attached anchor pin 501 as described above, for locking to the protective case of the smartphone, and also has an extension 1102 attached or as a contiguous part of the apparatus, specifically for interfacing to a lanyard 1103. Lanyard 1103 attaches to apparatus 1101 at an opening 1107 in one end of extension 1102, and has a loop 1104 of a size that a user may put over the user's head, or another part of the user's person. Apparatus 1101 further has an opening 1106 through the plane of the apparatus that is positioned so that a smartphone carried in apparatus 1101 will have a clear view for the camera lens and flash of the smartphone. A user wearing the lanyard may the pick up the smartphone without releasing from the anchor device, and take pictures. The smartphone can also be rotated on the lanyard (hanging upside down) so that it can be picked up and viewed with ease by the user.

In some embodiments apparatus 1101 may be larger, and may have a pocket of the size of the smartphone protective case, with an anchor pin in the pocket, such that the case and smartphone may be fitted into the pocket, where it will lock to the anchor pin. In this embodiment there may also be secondary pockets in the apparatus for such as cash, credit cards and the like, the apparatus serving as a wallet.

Figure 12:
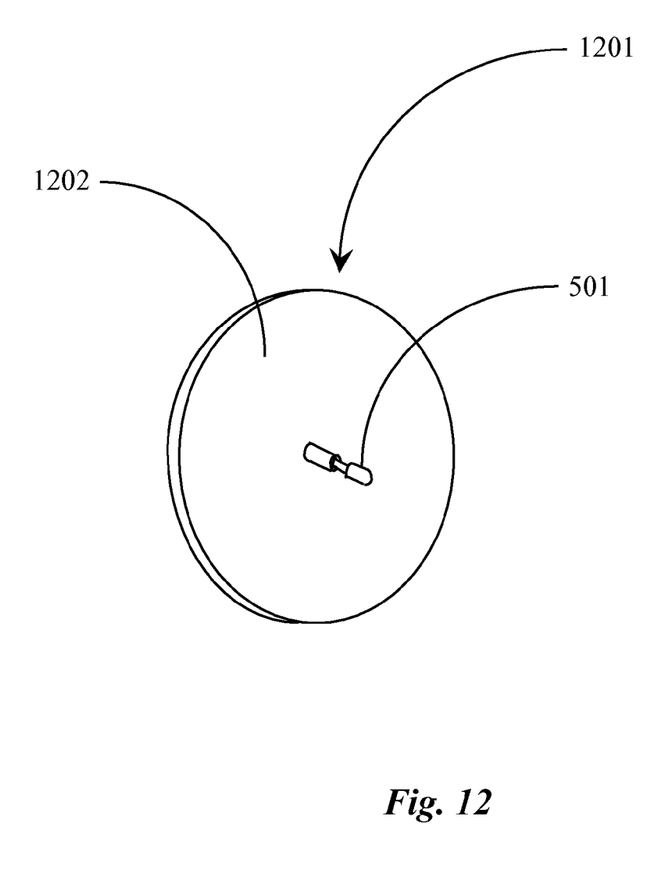
FIG. 12 illustrates an anchor object for use with clothing or other material in an embodiment of the present invention.

FIG. 12 is a perspective view of an anchor apparatus 1201 for providing an anchor through a user's clothing, or through a wall or fabric portion of a variety of anchor objects, such as a wallet or luggage, for example. Anchor apparatus 1201 comprises in this embodiment a disk 1202 with an anchor pin 501 securely fasted substantially in the center of the disk. Anchor pin 501 may be longer than in some other embodiments to account for the thickness of cloth or wall thickness through which the pin may be inserted. A user may pass the pin through an article of clothing, or some other relatively thin structure, such that disk 1202 remains on one side and a smartphone in a protective case according to an embodiment of the invention may be anchored to pin 501 on the opposite side. In some embodiments there may be one or more extensions in the plane of the disk with tabs at a right angle to provide stabilization for a case, such that the case, one anchored, cannot rotate about pin 501.

Figure 13:
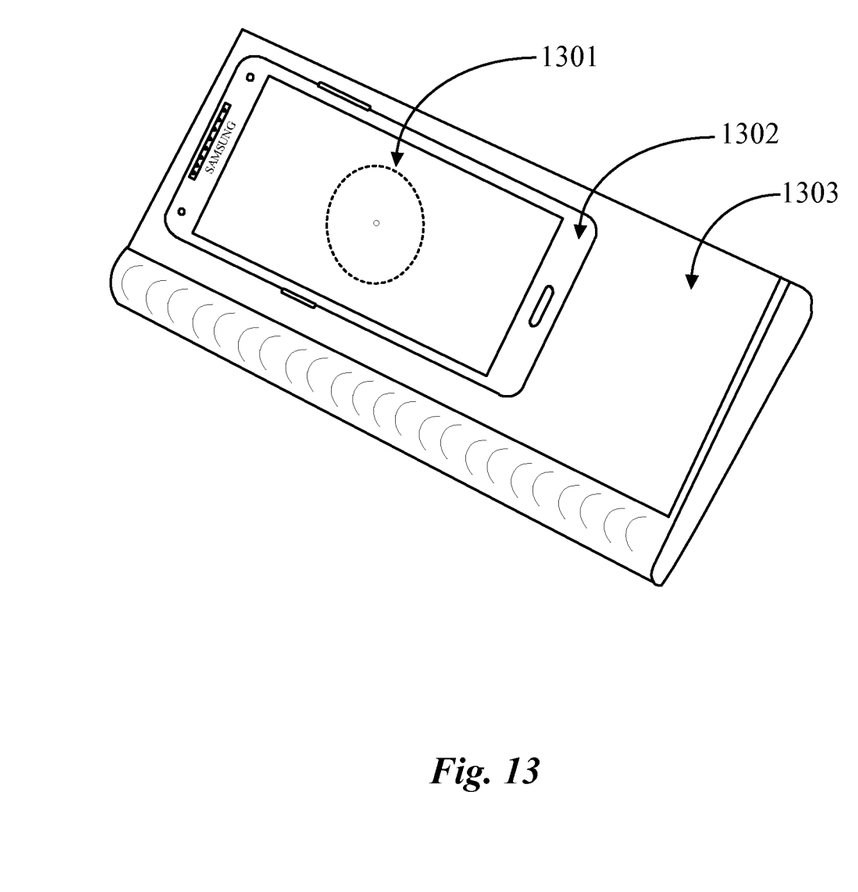
FIG. 13 illustrates a wallet anchor object in an embodiment of the invention.

FIG. 13 illustrates a wallet 1303 enabled as an anchor object in an embodiment of the present invention. In one variation the wallet may have an anchor pin as described elsewhere in this specification, the pin integrated with a flap of the wallet, and the enables phone 1302 may anchor to that pin. The pin may be added to a wallet using the anchor device illustrated in FIG. 12. In one embodiment the wallet may have a recessed pocket for the telephone. In yet another embodiment the phone may anchor to the wallet inside the folded wallet, either with or without a fitted pocket.

It will be apparent to the skilled person that there may be many variations of the embodiments described herein, such as in size, material, details of construction and the like, all of which will fall within the spirit and scope of the invention. The invention is limited only by the claims that follow.

The invention claimed is:

1. A protective case for a smartphone, comprising:
   a planar portion of about the length and width of the smartphone;
   an upper portion shaped to capture the smartphone around a periphery, leaving a touchcreen of the smartphone unobstructed, the upper portion enabled to fasten securely to the planar portion, securely capturing the smartphone;
   an opening into the planar portion, the opening having an axis at right angles to the plane of the planar portion on a side opposite the upper portion;
   pairing circuitry enclosed in the protective case for wirelessly pairing with the smartphone;
   a power source enclosed in the planar portion for powering circuitry and mechanisms in the protective case;
   a locking mechanism implemented in the planar portion proximate the opening, enabled to engage to an anchor pin inserted into the opening, the locking mechanism comprising at least one locking pin urged toward the opening by a spring element in a direction parallel to the plane of the planar portion, such that the anchor pin entering the opening causes the locking pin to retract against the spring element until a groove in the anchor pin is encountered, at which point the spring element urges the locking pin into the groove, locking the anchor pin to the planar portion of the protective case; and
   circuitry enabled to accept an unlock command via wireless communication from a smartphone executing a security application, the command causing the locking mechanism to release from an anchor pin.

2. The protective case of claim 1 comprising two locking pins urged from opposite sides toward the opening by two respective spring elements.

3. The protective case of claim 1 wherein the at least one locking pin translates in a bore having an axis parallel to the plane of the planar portion, the locking pin has a ferromagnetic element, and an electromagnet proximate the bore, when activated, causes the locking pin to retract, releasing the anchor pin.

4. The protective case of claim 3 wherein the protective case further comprises a switching element at a closed end of the opening, such that an anchor pin fully inserted into the opening operates the switching element, sending a command to a paired smartphone to execute the security application.

5. A protective case and smartphone assembly, comprising:
- a planar portion of the protective case of about the length and width of the smartphone;
- an upper portion capturing the smartphone around a periphery, leaving a touchcreen of the smartphone unobstructed, the upper portion fastening securely to the planar portion, securely capturing the smartphone;
- an opening into the planar portion, the opening having an axis at right angles to the plane of the planar portion on a side opposite the upper portion;
- pairing circuitry enclosed in the protective case for wirelessly pairing with the smartphone;
- a power source enclosed in the planar portion for powering circuitry and mechanisms in the protective case;
- a locking mechanism implemented in the planar portion proximate the opening, enabled to engage to an anchor pin inserted into the opening, the locking mechanism comprising at least one locking pin urged toward the opening by a spring element in a direction parallel to the plane of the planar portion, such that an anchor pin entering the opening causes the locking pin to retract against the spring element until a groove in the anchor pin is encountered, at which point the spring element urges the locking pin into the groove, locking the anchor pin to the planar portion of the protective case; and
- circuitry enabled to accept an unlock command via wireless communication from the smartphone executing a security application, the command causing the locking mechanism to release from an anchor pin.

6. The protective case and smartphone assembly of claim 5 comprising two locking pins urged from opposite sides toward the opening by two respective spring elements.

7. The protective case and smartphone assembly of claim 5 wherein the at least one locking pin translates in a bore having an axis parallel to the plane of the planar portion, the locking pin has a ferromagnetic element, and an electromagnet proximate the bore, when activated, causes the locking pin to retract, releasing the anchor pin.

8. The protective case and smartphone assembly of claim 7 wherein the protective case further comprises a switching element at a closed end of the opening, such that an anchor pin fully inserted into the opening operates the switching element, sending a command to a paired smartphone to execute the security application.

9. The protective case and smartphone assembly of claim 5 further comprising an anchor object having a planar surface to which one end of the anchor pin is securely attached, such that placing the protective case holding the smartphone onto the anchor object with the opening into the planar portion aligned with the anchor pin causes the anchor pin to enter the opening and the locking mechanism to engage the groove in the anchor pin.

10. The protective case and smartphone assembly of claim 9 wherein the planar surface of the anchor object has substantially the length and width of the smartphone, and comprises clips around a periphery enabled to capture and hold the protective case and smartphone, and guide loops on a side opposite the clips to engage a user's belt.

11. The protective case and smartphone assembly of claim 9 wherein the planar surface has substantially the length and width of the case and smartphone, comprises clips around a periphery enabled to capture and hold the case and smartphone, an extended element in the plane of the planar surface enabling connection to a lanyard, and an opening through the planar surface providing unobstructed visual access for a camera lens and flash of the smartphone.

\* \* \* \* \*